United States Patent
Sim

(10) Patent No.: US 9,545,922 B1
(45) Date of Patent: Jan. 17, 2017

(54) LANE KEEPING ASSISTANCE SYSTEM AND METHOD THEREOF

(71) Applicant: MANDO CORPORATION, Gyeonggi-do (KR)

(72) Inventor: Sang Kyun Sim, Anyang-si (KR)

(73) Assignee: MANDO CORPORATION, Gyeonggi-Do (KR)

(*) Notice: Subject to any disclaimer, the term of this patent is extended or adjusted under 35 U.S.C. 154(b) by 0 days.

(21) Appl. No.: 14/885,986

(22) Filed: Oct. 16, 2015

(30) Foreign Application Priority Data

Sep. 10, 2015 (KR) .......... 10-2015-0128206

(51) Int. Cl.
*B60W 30/12* (2006.01)

(52) U.S. Cl.
CPC .......... *B60W 30/12* (2013.01); *B60W 2420/42* (2013.01); *B60W 2420/52* (2013.01); *B60W 2710/20* (2013.01); *B60W 2720/24* (2013.01)

(58) Field of Classification Search
CPC ........ B62D 6/003; B62D 5/0457; G01C 21/30
See application file for complete search history.

(56) References Cited

U.S. PATENT DOCUMENTS

| | | | | |
|---|---|---|---|---|
| 8,194,927 | B2* | 6/2012 | Zhang | G06K 9/00798 382/104 |
| 8,204,277 | B2* | 6/2012 | Zhang | G06K 9/00798 382/104 |
| 8,311,283 | B2* | 11/2012 | Wu | B60W 30/12 348/148 |
| 2008/0109118 | A1* | 5/2008 | Schwartz | G06K 9/4609 701/1 |
| 2010/0182139 | A1* | 7/2010 | Chen | B62D 15/029 340/435 |
| 2014/0379164 | A1* | 12/2014 | Joh | G01C 21/30 701/1 |
| 2015/0274158 | A1* | 10/2015 | Fujita | B60W 30/00 701/23 |
| 2015/0307097 | A1* | 10/2015 | Steinmeyer | B60W 30/16 701/70 |
| 2015/0336607 | A1* | 11/2015 | Inoue | B60W 40/114 701/41 |

FOREIGN PATENT DOCUMENTS

| | | |
|---|---|---|
| DE | 10 2006 047 636 | 4/2008 |
| DE | 10 2008 008 172 | 8/2009 |
| DE | 10 2011 107 196 | 1/2012 |

OTHER PUBLICATIONS

Office Action dated May 31, 2016 for German Patent Application No. 10 2015 220 252.6.

\* cited by examiner

*Primary Examiner* — Thomas Tarcza
*Assistant Examiner* — Alex C Dunn
(74) *Attorney, Agent, or Firm* — Ladas & Parry, LLP

(57) ABSTRACT

Disclosed is a system that creates a lane model using a lane offset value and a lane heading angle and assists a vehicle in keeping its lane by using the lane model. More specifically, the system may include: a camera that obtains an image of the road; an image analyzing unit that detects lane markings by analyzing the image and calculates and stores the lane offset value from the detected lane markings; a radar that detects the position of the preceding vehicle; a preceding vehicle analyzing unit that calculates a preceding vehicle heading angle between the vehicle and the preceding vehicle; and a controller that, if the lane markings are blocked, applies the preceding vehicle heading angle to the lane heading angle to thereby create the lane model.

10 Claims, 7 Drawing Sheets

LANE KEEPING ASSISTANCE SYSTEM AND METHOD THEREOF

CROSS-REFERENCE TO RELATED APPLICATION

This application claims priority from and the benefit under 35 U.S.C. §119(a) of Korean Patent Application No. 10-2015-0128206, filed on Sep. 10, 2015, which is hereby incorporated by reference for all purposes as if fully set forth herein.

BACKGROUND OF THE INVENTION

1. Field of the Invention

The present invention relates to lane keeping assistance technology.

2. Description of the Prior Art

Vehicles that have recently been produced have adopted a variety of systems for safe driving. One of such systems is the lane keeping assistance system (LKAS). When the vehicle begins to move out of its lane due to careless driving, the lane keeping assistance system prevents the vehicle from deviating from its lane and controls the vehicle to stay in the lane.

The lane keeping assistance system analyzes images obtained by a camera in order to thereby recognize the lane. However, if there is no lane marking in the image obtained by the camera, the lane keeping assistance system fails to recognize the lane or misrecognizes the lane.

For a specific example, such a problem may be caused by a preceding vehicle that blocks the view of the camera on a congested road where the vehicles drive slowly. On the congested road, the distance between the preceding vehicle and the running vehicle is shortened, so the preceding vehicle obscures the view of the camera. In this situation, the image taken by the camera does not show the lane markings but shows the preceding vehicle. In this case, the lane keeping assistance system may fail to recognize the lane or may misrecognize the lane.

The system related to the safety of the vehicle should ensure the reliability to a certain degree in all conditions. Therefore, it is necessary to develop a lane keeping assistance system that enables reliable lane-recognition even on a congested road.

SUMMARY OF THE INVENTION

In this background, an aspect of the present invention provides technology that enables reliable lane-recognition even on a congested road. Another aspect of the present invention provides technology that enables reliable lane-recognition even in the case where the preceding vehicle blocks the lane.

In accordance with an aspect of the present invention, a system that creates a lane model using a lane offset value and a lane heading angle, and assists a vehicle in keeping its lane by using the lane model may include: a camera that obtains an image of the road; an image analyzing unit that detects lane markings by analyzing the image and calculates and stores the lane offset value from the detected lane markings; a radar that detects the position of the preceding vehicle; a preceding vehicle analyzing unit that calculates a preceding vehicle heading angle between the vehicle and the preceding vehicle; and a controller that, if a speed of the vehicle is equal to or less than a reference speed value, and if a distance to the preceding vehicle is equal to or less than a reference distance value, applies the preceding vehicle heading angle to the lane heading angle to thereby create the lane model.

In accordance with another aspect of the present invention, a method for creating a lane model using a lane offset value and a lane heading angle, and assisting a vehicle in keeping its lane by using the lane model may include: obtaining an image of the road through a camera; detecting lane markings by analyzing the image, and calculating and storing the lane offset value from the detected lane markings; detecting the position of the preceding vehicle through a radar; calculating a preceding vehicle heading angle between the vehicle and the preceding vehicle; if a speed of the vehicle is equal to or less than a reference speed value, and if a distance to the preceding vehicle is equal to or less than the first reference distance value, determining that the road is congested; and if it is determined that the road is congested as a result of the determination of congestion, and if a distance to the preceding vehicle is equal to or less than the second reference distance value, applying the preceding vehicle heading angle to the lane heading angle to thereby create the lane model.

According to the present invention as described above, the lane can be reliably recognized even on a congested road, and the lane can be reliably recognized even in the case where the preceding vehicle blocks the lane.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE EXEMPLARY EMBODIMENTS

Figure 1:
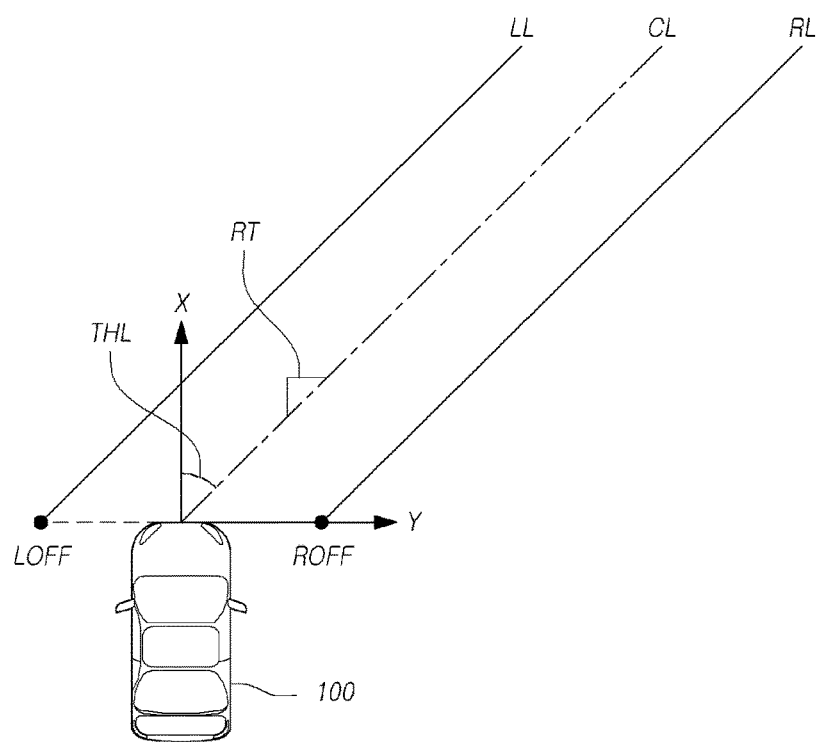
FIG. 1 illustrates a lane model that is applied to an embodiment.

Hereinafter, some embodiments of the present invention will be described in detail with reference to the accompanying drawings. In the following description, the same components will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

FIG. 1 illustrates a lane model that is applied to an embodiment.

Referring to FIG. 1, lane markings (LL and RL) may be comprised of the first lane marking (LL) that is positioned on one side of a running ego vehicle 100, and the second lane marking (RL) that is positioned on the other side thereof. In addition, a virtual third lane marking (CL) may be positioned at the center between the lane markings (LL and RL).

$$Y = C01 + C11 \cdot X \qquad \text{Equation 1}$$

The lane model that is applied to the embodiment may be expressed as the X-Y equation shown in Equation 1. Here, X denotes a travelling direction of the running ego vehicle 100, and Y denotes a direction that is perpendicular to the travelling direction of the running ego vehicle 100. In addition, the first coefficient (C01) may be applied with a lane offset value, and the second coefficient (C11) may be applied with a lane heading angle.

Here, the lane offset value represents a distance from the running ego vehicle 100 in the Y-direction. The lane offset value (LOFF) of the first lane marking (LL) and the lane offset value (ROFF) of the second lane marking (RL) may have different signs (+/−) from each other.

The lane heading angle is a value corresponding to an angle between the travelling direction of the running ego vehicle 100 and the lane markings (LL and RL), and it may be an angle value (THL) of the lane markings, or may be a gradient value (RT) of the lane markings.

$$RT = \tan(THL) \qquad \text{Equation 2}$$

The lane angle value (THL) and the gradient value (RT) may have the same relationship as Equation 2, and may be converted to each other. Hereinafter, it is assumed that the lane heading angle is the lane gradient value (RT) for the convenience of explanation.

The lane model expressed as Equation 1 is an example. The lane model, which can be applied to the present invention, is not limited to the form of Equation 1. For example, the lane model may further include curvature information.

$$Y = C01 + C11 \cdot X + C21 \cdot X^2 + C31 \cdot X^3 \qquad \text{Equation 3}$$

Here, the third coefficient (C21) may be applied with a curvature of the lane, and the fourth coefficient (C31) may be applied with a differential value of the curvature of the lane.

In the following description, it is assumed that the lane model follows Equation 1 for the convenience of explanation.

Meanwhile, in order to recognize the lane by using the lane model, the first coefficient (C01) and the second coefficient (C11) of the lane model are to be reliably calculated.

Figure 2:
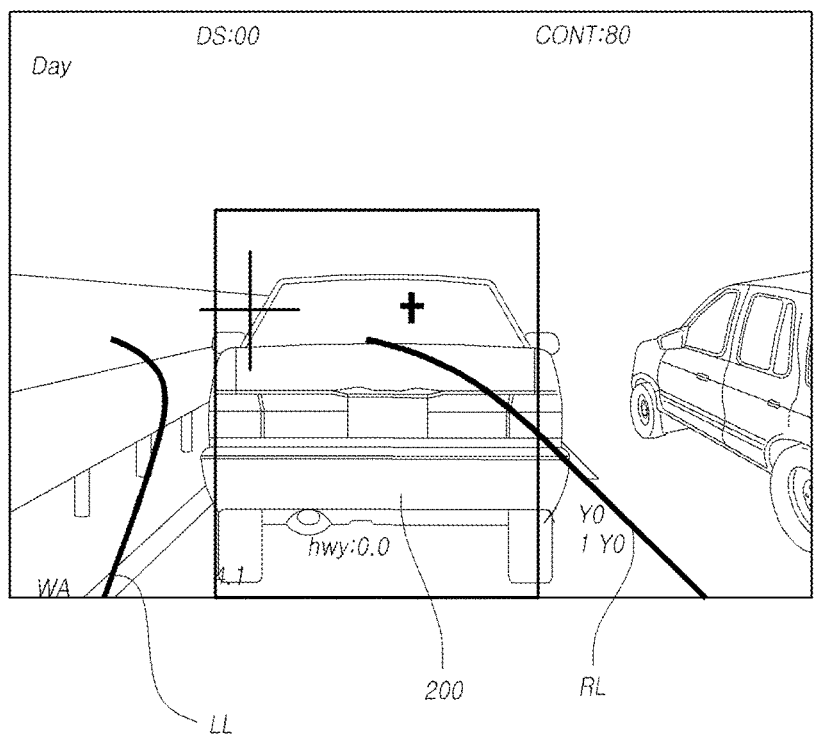
FIG. 2 illustrates an example in which the lane is misrecognized.

FIG. 2 illustrates an example in which the lane is misrecognized.

Referring to FIG. 2, in the image obtained through the camera, the lane markings are blocked in part by the preceding vehicle 200 so that the lane markings (LL and RL) are recognized as being in a different direction from the direction recognized through the screen. If the lane markings (LL and RL) are misrecognized as set forth above, the vehicle may drive in a direction that is not intended and may increase the risk of an accident.

Figure 3:
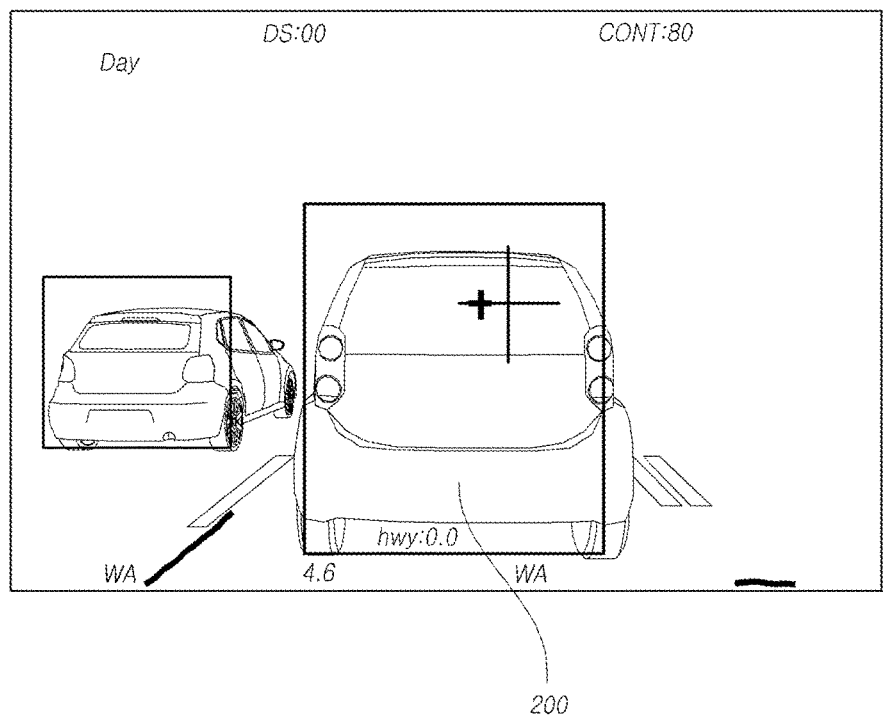
FIG. 3 illustrates an example in which the lane is not recognized.

FIG. 3 illustrates an example in which the lane is unrecognized.

Referring to FIG. 3, in the image obtained through the camera, the lane markings (LL and RL) are blocked by the preceding vehicle 200 so that the lane markings (LL and RL) are not recognized through the lane model. In order to create the lane model, a lane offset value, which may be applied to the first coefficient (C01), and a lane heading angle, which may be applied to the second coefficient (C11), are to be calculated. However, since the lane markings are obscured by the preceding vehicle 200 in the case of FIG. 3, the lane offset value and the lane heading angle cannot be calculated, so the lane model cannot be created.

As described in FIG. 2 and FIG. 3, the method, in which the lane offset value and the lane heading angle are calculated by analyzing the image obtained by the camera and the calculated lane offset value and lane heading angle are applied to the first coefficient (C01) and the second coefficient (C11), cannot solve the problem caused by the blocking of the lane markings by the preceding vehicle 200.

In order to solve the problem, the lane keeping assistance system, according to an embodiment, uses two methods as follows.

First, if the lane offset value is not calculated, the lane keeping assistance system, according to an embodiment, uses a lane offset value that has been previously calculated and stored. Since the lane offset value does not easily change, even though the lane offset value is used, which has been previously calculated and stored, the reliability can be secured.

Second, if the lane heading angle is not calculated, the lane keeping assistance system, according to an embodiment, may apply a preceding vehicle heading angle, which is an angle between the preceding vehicle 200 and the running ego vehicle 100, to the second coefficient (C11). Since both the preceding vehicle 200 and the running ego vehicle 100 are likely to drive while keeping the lane, the preceding vehicle heading angle between the preceding vehicle 200 and the running ego vehicle 100 may be similar to the lane heading angle.

The embodiment of the lane keeping assistance system that uses the two methods above will be described with reference to FIG. 4 to FIG. 6.

Figure 4:
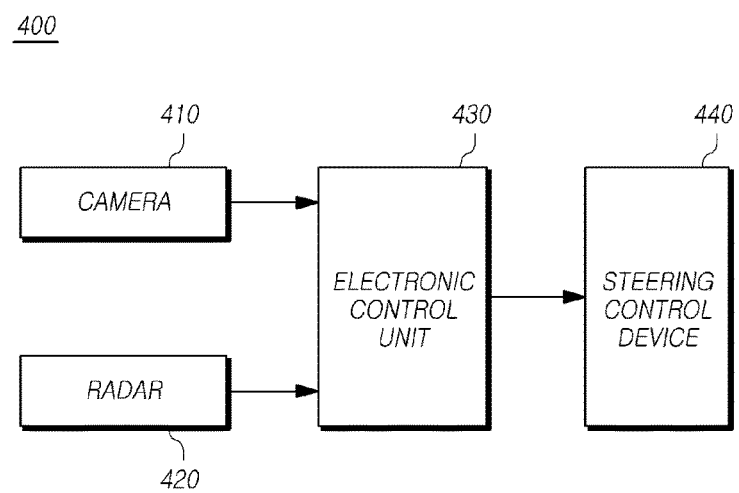
FIG. 4 is a block diagram of a lane keeping assistance system 400, according to an embodiment.

FIG. 4 is a block diagram of the lane keeping assistance system 400, according to an embodiment.

Referring to FIG. 4, the lane keeping assistance system 400 may include a camera 410, radar 420, an W electronic control unit 430, and a steering control device 440. Here, the steering control device 440 may be configured as a separate system, and only the camera 410, the radar 420, and the electronic control unit 430 may be included in the lane keeping assistance system 400. However, even in this case, the electronic control unit 430 may be associated such that the electronic control unit 430 transmits a control signal to the steering control device 440.

The camera 410 may photograph the road ahead of the running ego vehicle 100 in order to thereby obtain images thereof. In some cases, the camera 410 may photograph the road in the rear or side of the running ego vehicle 100 in order to thereby obtain the images. The camera 410 may take the images by using a CCD (Charge Coupled Device) or a CMOS (Complementary Metal-Oxide Semiconductor) device.

The radar 420 may detect the position of the preceding vehicle 200. The radar 420 may detect the direction of the preceding vehicle 200 and the distance to the preceding vehicle 200 in order to recognize the position of the preceding vehicle 200.

The running ego vehicle 100 may further include a sensor that measures a vehicle speed, and a sensor that measures a steering angle. The lane keeping assistance system 400 may obtain a speed of the running ego vehicle 100 or a steering angle of the running ego vehicle 100 by using the sensors.

The electronic control unit 430 may detect the lane markings by analyzing the image acquired by the camera 410, and may calculate the lane offset value from the detected lane markings to then store the same. Furthermore, the electronic control unit 430 may calculate a preceding vehicle heading angle between the running ego vehicle 100 and the preceding vehicle 200 by using position information of the preceding vehicle 200 that is obtained through the radar 420.

The electronic control unit 430 may create a lane model by using the lane offset value and the preceding vehicle heading angle, and may control the steering control device 440 according to the lane model in order to assist the running ego vehicle 100 in keeping its lane.

Figure 5:
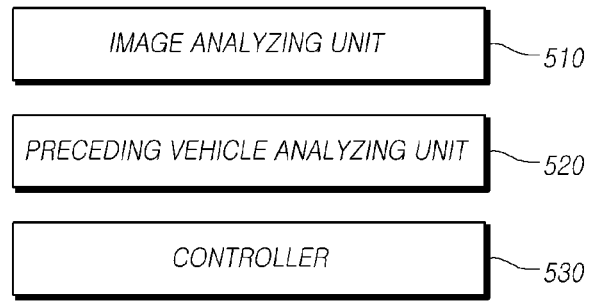
FIG. 5 is a block diagram of an electronic control unit of FIG. 4.

FIG. 5 is a block diagram of the electronic control unit of FIG. 4.

Referring to FIG. 5, the electronic control unit 430 may include an image analyzing unit 510, a preceding vehicle analyzing unit 520, and a controller 530.

The image analyzing unit 510 may detect lane markings by analyzing the images acquired by the camera 410, and may calculate the lane offset value and the lane heading angle from the detected lane markings to then store the same.

The controller 530 may create the lane model by using the lane offset value and the lane heading angle, which are calculated by the image analyzing unit 510. For example, if the lane model follows Equation 1, the controller 530 may apply the lane offset value, which is calculated by the image analyzing unit 510, to the first coefficient (C01), and may apply the lane heading angle, which is calculated by the image analyzing unit 510, to the second coefficient (C11).

If no lane marking is recognized in the image obtained by the camera 410, the controller 530 may create the lane model by using the lane offset value and the lane heading angle, which are calculated by the image analyzing unit 510.

In particular, the controller 530 may separate the speed of the running ego vehicle 100 into a high speed mode and a low speed mode, and may create the lane model by using the lane offset value and the lane heading angle, which are calculated by the image analyzing unit 510, in the high speed mode. Here, the high speed mode refers to the case where the speed of the running ego vehicle 100 exceeds a predetermined reference speed value; for example, the case where the speed of the running ego vehicle 100 is greater than 55 Km/h.

Also, if the distance to the preceding vehicle 200 exceeds a reference distance value, the controller 530 may calculate the lane heading angle through the image analyzing unit 510, and may create the lane model by using the calculated lane heading angle. Here, the reference distance value may be 20 m.

The preceding vehicle analyzing unit 520 may calculate the preceding vehicle heading angle between the running ego vehicle 100 and the preceding vehicle 200 by using the position of the preceding vehicle 200 that is obtained through the radar 420.

The controller 530 may create the lane model by using a lane offset value that was previously stored, or a lane offset value and a preceding vehicle heading angle, which are calculated by the image analyzing unit 510. For example, when the lane model follows Equation 1, the controller 530 may apply a lane offset value, which was previously stored, to the first coefficient (C01), and may apply the preceding vehicle heading angle, which is calculated by the preceding vehicle analyzing unit 520, to the second coefficient (C11).

If no lane marking is recognized in the image obtained by the camera 410, the controller 530 may create the lane model by using the preceding vehicle heading angle that is calculated through the preceding vehicle analyzing unit 520.

In particular, the controller 530 may create the lane model by using the preceding vehicle heading angle, which is calculated by the preceding vehicle analyzing unit 520, in the low speed mode.

If the speed of the running ego vehicle 100 is equal to or less than a reference speed value, and if a distance to the preceding vehicle 200 is equal to or less than a reference distance value, the controller 530 may apply the preceding vehicle heading angle to the lane heading angle to thereby create the lane model. In Equation 1, the second coefficient (C11) corresponds to the lane heading angle. If the calculated lane heading angle is not reliable, the controller 530 may apply the preceding vehicle heading angle to the lane heading angle to thereby create the lane model. Here, it may be understood that applying the preceding vehicle heading angle to the lane heading angle means replacing the lane heading angle with the preceding vehicle heading angle. Alternatively, it may mean that the preceding vehicle heading angle is applied to the second coefficient (C11).

If the speed of the running ego vehicle 100 is equal to or less than a reference speed value, and if the distance to the preceding vehicle 200 is equal to or less than the reference distance value, the controller 530 may determine that the corresponding road is congested or traffic is congested. On a congested road, the lane offset value and the lane heading angle, which are calculated through the image analyzing unit 510, may not be reliable. In this case, the controller 530 may create the lane model by using the lane offset value that was previously stored, or by using the preceding vehicle heading angle that is calculated by the preceding vehicle analyzing unit 520.

If the speed of the running ego vehicle 100 is equal to or less than the reference speed value, and if the distance to the preceding vehicle 200 is equal to or less than a reference distance value when no lane marking is recognized by the image analyzing unit 510, the controller 530 may create the lane model by using the lane offset value that was previously stored. At this time, the controller 530 may average the lane offset values that were previously stored in order to thereby calculate the first coefficient (C01). For example, the controller 530 may apply an average lane offset value, which is obtained by averaging lane offset values that are stored for a specific period of time, to the first coefficient (C01) in order to thereby create the lane model.

Only one of two lane markings may not be recognized from the image obtained by the camera 410. For example, in the lane model of FIG. 1, the first lane marking (LL) may be recognized, whereas the second lane marking (RL) may not be recognized. At this time, the controller 530 can calculate a lane offset value of the second lane marking (RL) by using a lane offset value that is calculated with respect to the first lane marking (LL) among the two lane markings.

When the image analyzing unit 510 calculates and stores the lane offset value and the lane heading angle, the image analyzing unit 510 may calculate and store the lane width as well. For example, in the lane model of FIG. 1, the lane offset value (LOFF) of the first lane marking (LL) and the lane offset value (ROFF) of the second lane marking (RL) are simultaneously calculated, and the lane width may be calculated using a difference between the lane offset values (LOFF and ROFF).

If one of the two lane markings is misrecognized or unrecognized, the controller 530 may add or subtract the lane width, which is pre-calculated, to or from the lane offset value of one lane marking, which is normally calculated, in order to thereby calculate the lane offset value of the other lane marking.

Meanwhile, the lane width may have a predetermined value. In addition, if there is no lane width value, the controller 530 may calculate the lane offset value of the other lane marking by using a predetermined vehicle width value.

The controller 530 may configure the position of the running ego vehicle 100 to be the center between the lane markings, and may allocate a half of the lane width, which was calculated and stored previously by the image analyzing unit 510, to the left side and right side of the central line to thereby calculate the lane offset value.

If the lane markings are not normally recognized from the image obtained by the camera 410, or if the image acquired by the camera 410 is not reliable, the controller 530 may apply the preceding vehicle heading angle, which is calculated through the preceding vehicle analyzing unit 520, to the lane heading angle to thereby create the lane model.

Figure 6:
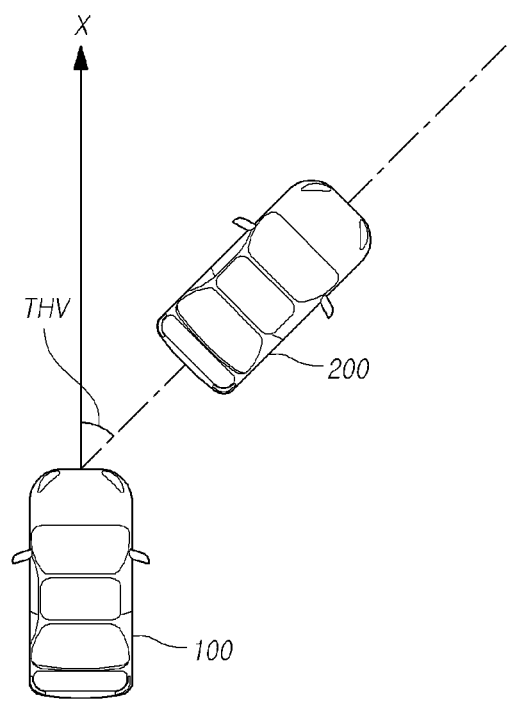
FIG. 6 illustrates a preceding vehicle heading angle and the third lane marking.

FIG. 6 illustrates a preceding vehicle heading angle and the third lane.

Referring to FIG. 6, the running ego vehicle 100 and the preceding vehicle 200 are likely to drive along the third lane marking (CL) in the center of the lane markings of the lane model shown in FIG. 1.

The preceding vehicle analyzing unit 520 may detect the position of the preceding vehicle 200 through the radar 420, and may calculate a preceding vehicle travelling angle (THV) between the running ego vehicle 100 and the preceding vehicle 200. Although the preceding vehicle heading angle (THV) is expressed as an angle value in FIG. 6, the preceding vehicle heading angle may be expressed as a gradient value rather than an angle value.

The preceding vehicle analyzing unit 520 may obtain direction information of the running ego vehicle 100 from the steering sensor. Then, the preceding vehicle analyzing unit 520 may obtain direction information of the preceding vehicle 200 through the radar 420. The preceding vehicle analyzing unit 520 may calculate the preceding vehicle heading angle (THV) by using the obtained direction of the running ego vehicle 100 and the obtained direction of the preceding vehicle 200.

When both the running ego vehicle 100 and the preceding vehicle 200 are positioned on the third lane marking (CL), the preceding vehicle heading angle (THV) may be substantially the same as the lane heading angle (THL) shown in FIG. 1.

According to the relationship above, if the lane heading angle is not able to be calculated, or if the lane heading angle is not reliable, the controller 530 may create the lane model by using the preceding vehicle heading angle.

Meanwhile, a plurality of vehicles ahead may be detected through the radar 420. At this time, the controller 530 may estimate the travelling path of the running ego vehicle 100, and may configure the vehicle that is positioned within a specific range from the travelling path as the preceding vehicle 200.

Figure 7:
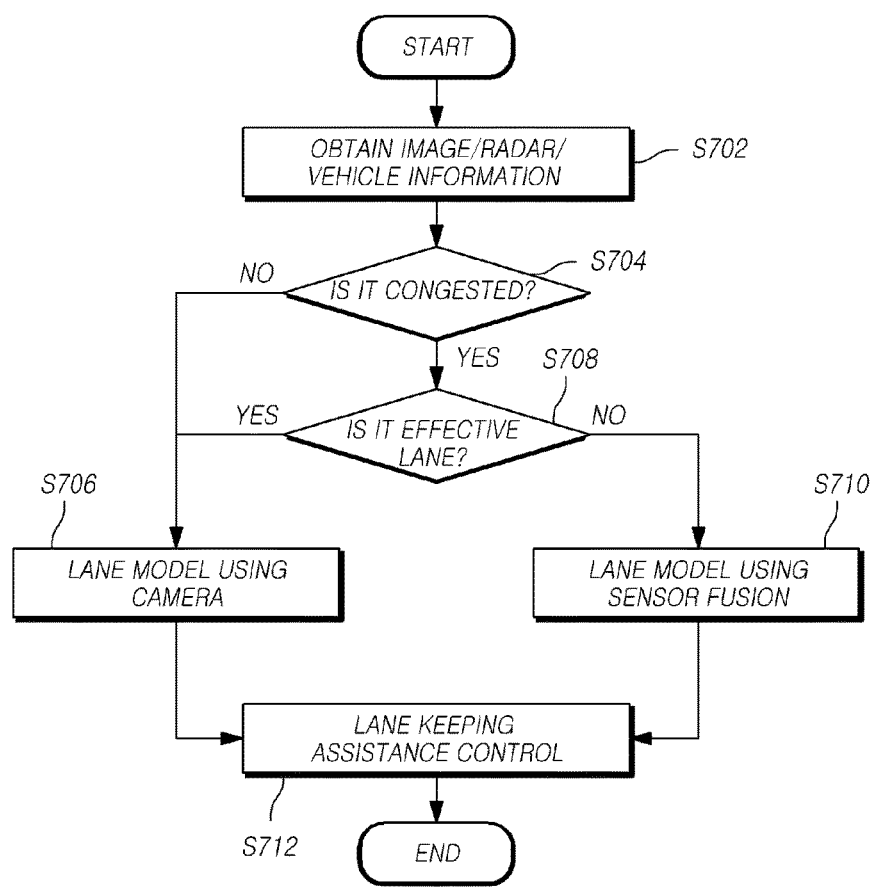
FIG. 7 is a flowchart of a lane keeping assistance method, according to an embodiment.

FIG. 7 is a flowchart of a lane keeping assistance method, according to an embodiment.

Referring to FIG. 7, the lane keeping assistance system 400 may: obtain an image of the road; detect the position of the preceding vehicle 200; and measure a speed and a steering direction of the running ego vehicle 100 through the camera 410, the radar 420, and various sensors (e.g., a vehicle speed sensor, a steering sensor, or the like) (S702).

The lane keeping assistance system 400 may determine the congested road based on the speed of the running ego vehicle 100, and the distance between the running vehicle ego 100 and the preceding vehicle 200 (S704).

In operation S704, if the speed of the running ego vehicle 100 is equal to or less than a reference speed value, and if the distance to the preceding vehicle 200 is equal to or less than the first reference distance value, the lane keeping assistance system 400 may determine that the road is congested or traffic is congested ("YES" in operation S704).

In operation S704, if the speed of the running ego vehicle 100 exceeds the reference speed value, or if the distance to the preceding vehicle 200 exceeds the first reference distance value, the lane keeping assistance system 400 may determine that the road is not congested or traffic is not congested ("NO" in operation S704).

If it is determined that the road is not congested ("NO" in operation S704), the lane keeping assistance system 400 may calculate a lane offset value and a lane heading angle by analyzing the image acquired by the camera 410, and may create the lane model by using the lane offset value and the lane heading angle (S706). At this time, the calculated lane offset value and the lane heading angle may be stored in a memory to be used later.

If it is determined that the road is congested in operation S704 ("YES" in operation S704), the lane keeping assistance system 400 may determine whether or not effective lane markings are recognized through the image (S708). If the distance to the preceding vehicle 200 is equal to or less than the first reference distance value and more than the second reference distance value in operation S708, the lane keeping assistance system 400 may determine that the effective lane marking is recognized from the image ("YES" in operation S708).

If it is determined the effective lane marking is recognized ("YES" in operation S708), the lane keeping assistance system 400 may analyze the image acquired by the camera 410 in order to thereby calculate a lane offset value and a lane heading angle, and may create the lane model by using the lane offset value and the lane heading angle (S706).

If it is determined that no effective lane marking is recognized in operation S708 ("NO" in operation S708), the lane keeping assistance system 400 may create the lane model by using a lane offset value that was previously stored, and a preceding vehicle heading angle between the running ego vehicle 100 and the preceding vehicle 200 (S710). That is, if it is determined that the road is congested or traffic is congested, and if the distance to the preceding vehicle 200 is equal to or less than the second reference distance value, the lane keeping assistance system 400 may apply the preceding vehicle heading angle to the lane heading angle in order to thereby create the lane model.

Once the lane model is created, the lane keeping assistance system 400 may perform the lane keeping assist control using the lane model (S712).

Meanwhile, the lane information, which was previously stored, is likely to be accurate within a specific period of time from the operation of determining that the road is congested. In this case, the lane keeping assistance system 400 may create the lane model by using the lane offset value and the lane heading angle, which were previously stored.

In addition, if a reliability value of the lane recognition is low (for example, in the case where the reliability value is less than or equal to 2), the lane keeping assistance system 400 may create the lane model by using the preceding vehicle heading angle without using the lane heading angle that is obtained through the image analysis.

In addition, if the vehicle changes the lane on a congested road, the lane keeping assistance system 400 may assume that the running ego vehicle 100 is positioned in the center of the lane to thereby calculate the lane offset value by allocating a half of the lane width to the left side and right side of the central line without using the lane offset value that was previously stored, and may create the lane model by using the lane offset value.

According to the present invention as described above, it is possible to reliably recognize the lane even on a congested road, and it is possible to reliably recognize the lane even in the case where the lane markings are blocked by the preceding vehicle.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. A system that creates a lane model using a lane offset value and a lane heading angle and assists a vehicle in keeping its lane by using the lane model, the system comprising:
    a camera that obtains an image of the road;
    an image analyzing unit that detects lane markings by analyzing the image and calculates and stores the lane offset value from the detected lane markings;
    a radar that detects the position of the preceding vehicle;
    a preceding vehicle analyzing unit that calculates a preceding vehicle heading angle between the vehicle and the preceding vehicle; and
    a controller that, if a speed of the vehicle is equal to or less than a reference speed value, and if a distance to the preceding vehicle is equal to or less than a reference distance value, applies the preceding vehicle heading angle to the lane heading angle to thereby create the lane model.

2. The system of claim 1, wherein the controller, if the speed of the vehicle is equal to or less than the reference speed value, and if the distance to the preceding vehicle is equal to or less than the reference distance value, when no lane marking is recognized by the image analyzing unit, creates the lane model by using a lane offset value that was previously stored.

3. The system of claim 2, wherein the controller averages the lane offset values that were previously stored in order to thereby create the lane model.

4. The system of claim 1, wherein the controller calculates a lane offset value of the second lane marking by using a lane offset value that is calculated with respect to the first lane marking among two lane markings.

5. The system of claim 4, wherein the controller calculates the lane offset value of the second lane marking by adding a vehicle width or a lane width, which is pre-calculated or predetermined, to the lane offset value that is calculated with respect to the first lane marking.

6. The system of claim 1, wherein the controller, if the speed of the vehicle exceeds the reference speed value, or if the distance to the preceding vehicle exceeds the reference distance value, calculates the lane heading angle through the image analyzing unit.

7. The system of claim 1, wherein the controller estimates a travelling path of the vehicle, and the preceding vehicle is positioned within a specific range from the travelling path.

8. The system of claim 1, wherein the image analyzing unit detects the lane markings, and calculates and stores the lane width from the detected lane markings, and the controller configures the position of the vehicle to be the center of the lane and allocates a half of the lane width, which is stored by the image analyzing unit, to the left side and right side of the central line to thereby calculate the lane offset value.

9. A method for creating a lane model using a lane offset value and a lane heading angle, and assisting a vehicle in keeping its lane by using the lane model, the method comprising:
    obtaining, by a camera, an image of the road;
    detecting, by an image analyzing unit, lane markings by analyzing the image, and calculating and storing the lane offset value from the detected lane markings;
    detecting, by a radar, the position of the preceding vehicle;
    calculating, by a preceding vehicle analyzing unit, a preceding vehicle heading angle between the vehicle and the preceding vehicle;
    if a speed of the vehicle is equal to or less than a reference speed value, and if a distance to the preceding vehicle is equal to or less than the first reference distance value, determining, by a controller, that the road is congested; and
    if it is determined that the road is congested as a result of the determination of congestion, and if a distance to the preceding vehicle is equal to or less than the second reference distance value, applying, by the controller, the preceding vehicle heading angle to the lane heading angle to thereby create the lane model.

10. The method of claim 9, further comprising, if it is determined that the road is congested as a result of the determination of congestion, and if a distance to the preceding vehicle exceeds the second reference distance value, creating, by the controller, the lane model by using a lane offset value and a lane heading angle, which are calculated by analyzing the image.

* * * * *